No. 627,709. Patented June 27, 1899.
C. SCHMAHL.
COUPLING FOR ANIMALS.
(Application filed May 14, 1898.)
(No Model.)
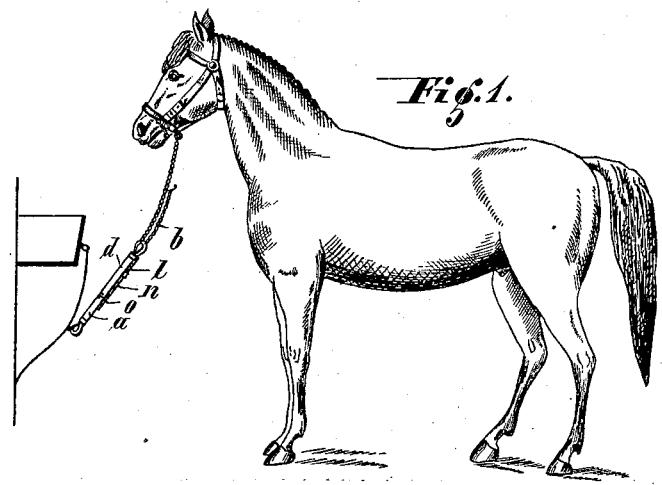
Fig. 1.
Fig. 2.
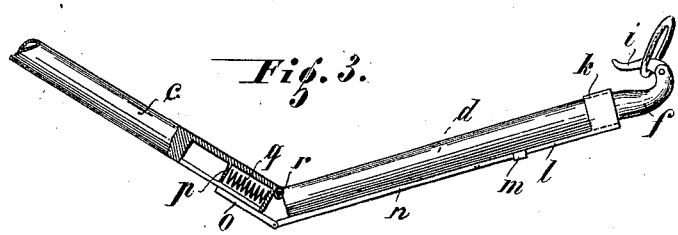
Fig. 3.
Fig. 4.
Witnesses:
Frank S. Ober
Geo. S. Kennedy
Inventor,
Carl Schmahl
by Wm. Rosenbaum
his atty.

UNITED STATES PATENT OFFICE.

CARL SCHMAHL, OF AHRENSBÖK, GERMANY.

COUPLING FOR ANIMALS.

SPECIFICATION forming part of Letters Patent No. 627,709, dated June 27, 1899.

Application filed May 14, 1898. Serial No. 680,744. (No model.)

*To all whom it may concern:*

Be it known that I, CARL SCHMAHL, a subject of the Prince of Lubeck, residing at Ahrensbök, in the Principality of Lubeck, in the Empire of Germany, have invented certain new and useful Improvements in Couplings for Animals, (for which I have applied for patents in England, dated April 1, 1898, No. 7,801; in France, dated March 31, 1898, No. 264,320; in Belgium, dated March 31, 1898, No. 105,146; in Russia, dated March 28, 1898, No. 4,332; in Sweden, dated March 28, 1898, No. 517; in Austria, dated March 26, 1898, and in Hungary, dated March 29, 1898, No. 4,426,) of which the following is a specification.

This invention relates to a coupling for animals, which permits them to free themselves should they on lying down or through excitement throw a foot over their halter. By this arrangement the overseer is much relieved and the animals are saved much unnecessary excitement and waste of strength.

In order that my said invention may be more readily understood and easily carried into effect, I will proceed to describe the same with reference to the accompanying drawings, in which—

Figure 1 is a side view of a horse chained with the coupling; Fig. 2, a side view of the contrivance in a closed state. Fig. 3 is a side view of the contrivance in an open state.

As shown in Fig. 1 of the drawings, the special coupling contrivance $a$ is placed midway between the halter-chain and the feeding-trough. The contrivance $a$ consists, essentially, of two parts $c$ $d$, held together by joints, at the end of which parts the hooks $e$ $f$ are fixed. The hook $e$, which is provided with a movable nose $g$, can be opened by means of the movable ring $h$ on the rod $C$ and fastened to the manger. The hook F is likewise provided with a movable nose $i$, which can also be secured against opening by a ring $k$. To this ring a rod $l$ is fastened, which is led by the guide $m$ along the rod $d$. To the rod $l$ is pivotally linked a rod $n$, which in turn is fastened to a rod $o$, also capable of being pivoted. The rod $o$ is provided with an arm $p$, by which it is led to the rod $c$ and against which a spiral spring $q$ bears. (See Fig. 4.)

The manner of working the contrivance is as follows: The rod $c$ and $d$ forms one bar in the resting or normal position, Fig. 2. The coupling-hook $f$ is held closed by the ring $k$ and the rod is held in position by the spring $q$, the animal being thus securely attached to the manger; but should the animal step over the halter $a$ and $b$ the rod $c$ $d$ will give way in the middle by means of its joint $r$, Fig. 3, under the strain and weight of the animal. The rods $l$, $n$, and $o$ will draw back the securing-ring $k$ of the coupling and the nose $i$ of the coupling-hook $f$ will be freed, so that the halter-chain becomes quite loose and the animal is saved from useless struggling to free his leg from its unnatural position. Should the animal even get so low that the rope is completely stretched and an opening of the chain-hook is no longer possible, it is only necessary to draw back the ring $h$ in order to effect an easy uncoupling.

What I claim, and desire to secure by Letters Patent of the United States, is—

In a coupling device for animals, the combination of a rod formed in two parts hinged together, and provided with a hook at one end, said hook having a pivoted nose, a locking-ring surrounding the rod and adapted to slide over said nose, sectional rod $l$, $n$, $o$, actuating said ring and a spring $q$ confined inside of one of the parts of the main rod and adapted to actuate said sectional rod when the two parts of the main rod swing on the hinge connecting them.

In testimony whereof I have hereunto set my hand in the presence of two witnesses.

CARL SCHMAHL.

Witnesses:
 E. H. L. MUMMENHOFF,
 HUGH PITCAIRN.